United States Patent
Zhukovsky et al.

[15] 3,675,772
[45] July 11, 1972

[54] FUEL-FEED SYSTEM FOR AN AIRCRAFT ENGINE

[72] Inventors: Alexandr Ivanovich Zhukovsky, ulitsa Stepana Supruna, 12 kv. 11; Anatoly Lukich Dobroskokov, Starve shasse, 12a, kv. 28; Vasily Ivanovich Orlovsky, ploschad vostania, 1, kv. 364, all of Moscow, U.S.S.R.

[22] Filed: Dec. 2, 1970

[21] Appl. No.: 94,620

Related U.S. Application Data

[63] Continuation of Ser. No. 782,333, Dec. 9, 1968, abandoned.

[52] U.S. Cl. .................................. 210/90, 210/106, 210/130
[51] Int. Cl. ........................................................... B01d 29/38
[58] Field of Search .................................. 210/90, 106–108, 210/130, 132, 137, 391, 408, 409

[56] References Cited

UNITED STATES PATENTS

| | | | |
|---|---|---|---|
| 2,670,082 | 2/1954 | Dunn et al. | 210/90 |
| 2,851,161 | 9/1958 | Dahlstrom et al. | 210/137 X |
| 2,865,442 | 12/1958 | Halford et al. | 210/106 X |
| 3,214,020 | 10/1965 | Banker | 210/108 |

FOREIGN PATENTS OR APPLICATIONS

| | | | |
|---|---|---|---|
| 1,165,054 | 10/1958 | France | 210/391 |

*Primary Examiner*—John Adee
*Attorney*—Waters, Roditi, Schwartz & Nissen

[57] ABSTRACT

A fuel-feed system for an aircraft engine is provided with a filter, and inlet and outlet piping coupled with the filter. A differential pressure transmitter is coupled with the filter for sensing a pressure build-up when ice deposits on the filter in flight. Return piping is provided for passing fluid into a nozzle spaced proximate the filter. A shut-off valve is coupled with the transmitter and is connected in the return piping to pass fluid to the nozzle when signaled by the transmitter.

4 Claims, 1 Drawing Figure

PATENTED JUL 11 1972    3,675,772
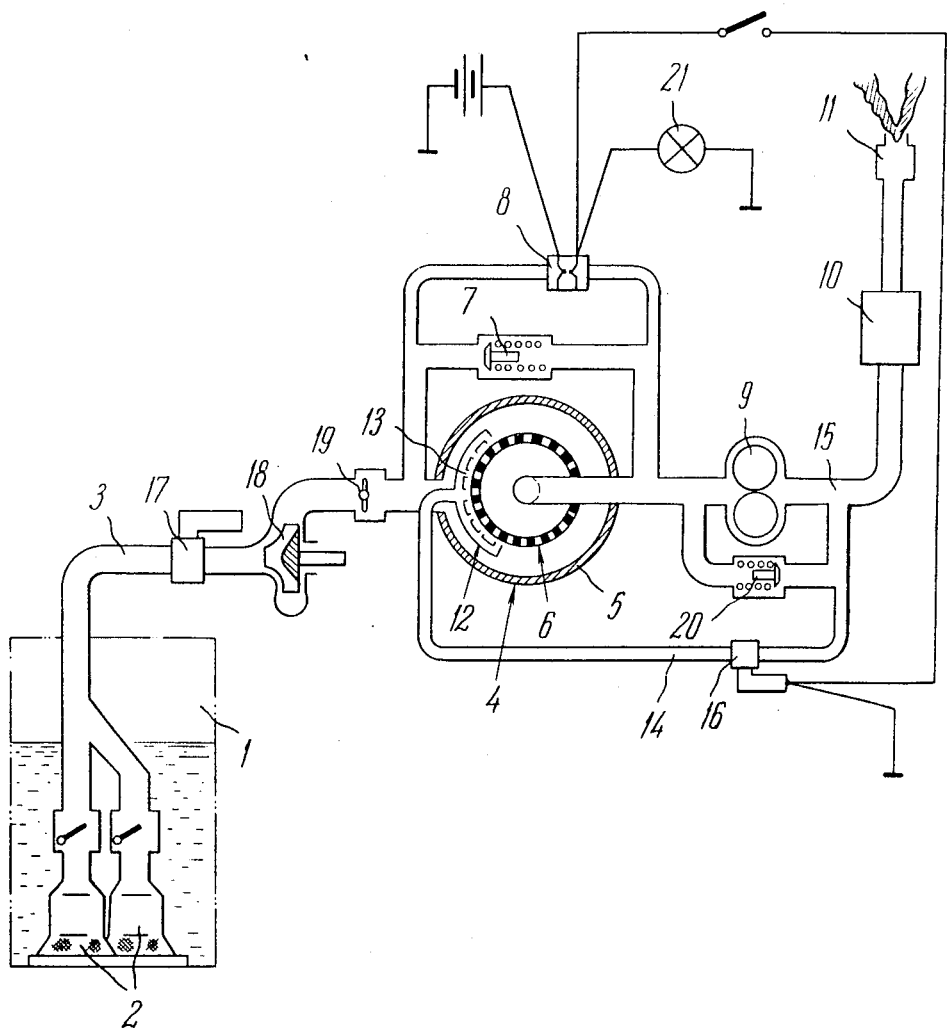

FUEL-FEED SYSTEM FOR AN AIRCRAFT ENGINE

This Application is a Continuation of Ser. No. 782,333 filed Dec. 9, 1968, and now abandoned.

The present invention relates to aircraft engines and, more particularly, to fuel-feed systems.

Commonly known are fuel-feed systems, wherein there is a filter for cleaning fuel and a means for restoring its filtering ability in flight, when ice crystals deposit on the surface of the filter.

Said means is constituted as a fuel heater mounted upstream of the filter and controlled by a signal from a differential pressure transmitter of said filter.

Also known is a means for restoring the filtering ability of the filtering element, fashioned as scrapers enclosed in the filter.

In the known fuel-feed systems, the means for restoring the filtering ability of the filter are complicated and insufficiently reliable in operation. The heating of fuel results in the formation of resins, coke and other therein which contaminate the filter and potentially lead to fire in the case of failures in the system.

The provision of scrapers results in damage or even destruction of the filtering element.

It is an object of the present invention to provide a simple and reliable fuel-feed system insuring normal operation of the engine in flight despite the deposition of ice crystals or dirt on the filtering element.

The above-mentioned object is achieved by providing a fuel-feed system for an aircraft engine, wherein the fuel-cleaning filter has a means for restoring its filtering ability, and a differential pressure transmitter.

According to the invention, the means for restoring the filtering ability is constituted as a nozzle placed in the filter, directed towards the filtering element and connected by pipeline with a high-pressure main. A shut-off device is mounted in the pipeline and is electrically coupled with the differential pressure transmitter.

The nozzle may be constituted as a bent pipe with a number of holes, said pipe embracing the filtering element.

The fuel-feed system of the engine, according to the present invention, insures the normal operation of the engine despite the deposition of ice crystals or dirt on the filtering element.

The invention will be more apparent from an exemplary embodiment of the present invention thereof, reference being had to the appended drawing which shows a circuit diagram of the fuel-feed system of the engine of the invention.

The fuel-feed system comprises a tank 1 with booster pumps 2 installed therein and connected by a pipeline 3 with a filter 4.

The filter has a housing 5 enclosing a filtering element 6.

Parallel to the filter 4 is a by-pass valve 7 and a differential pressure transmitter 8.

The filter 4 is communicated with a high-pressure pump 9 feeding the fuel to a fuel metering unit 10, from where it passes to burners 11.

The filter 4 is provided with a means for restoring its filtering ability.

Said means is made as a nozzle 12 directed towards the filtering element. In an exemplary embodiment, the nozzle 12 is constituted as a bent pipe with a number of holes 13, embracing the filtering element 6 partially or completely. The bent pipe is connected by a pipeline 14 with a high-pressure main 15 leading from the high-pressure pump 9 to the fuel-metering unit 10.

Mounted on the pipeline 14 is a shutoff device 16 constituted as a valve and linked with the differential pressure transmitter 8.

The fuel-feed system functions as follows.

From the tank 1, fuel passes to the filter 4 with the aid of the booster pumps 2 via the pipeline 3, passing through a cutoff valve 17, a low-pressure pump 18 and a flow gauge 19. From the filter 4, fuel is fed to the high-pressure pump 9, wherefrom it passes to the fuel-metering unit 10, via the main 15, and then to the burners 11. The excess quantity of fuel, fed by the high-pressure pump 9, is passed to the inlet of said pump 9 via a bypass valve 20.

In the case of blocking of the filtering element 6 or deposition on it of ice crystals, the differential pressure on the filter increases. A higher differential pressure on the filter results in the operation of the transmitter 8, signalled by an indicating lamp 21.

The operation of the differential pressure transmitter 8 causes the automatic or manual opening of the shutoff device 16. As a result, high-pressure fuel passes to the nozzle 12 via the pipeline 14 and then in streams, through the holes 13, to the filtering element 6 cleaning it from the deposition and thus restoring its filtering ability.

Once the filtering ability of the filter is restored, the differential pressure on it decreases, the transmitter 8 cuts out the indicating lamp 21, and the shutoff device 16 becomes inoperative.

When describing the exemplary embodiments of the present invention concrete narrow terminology has been used for the sake of clarity.

However, the invention is not limited by terms adopted and it should be borne in mind that each of these terms embraces all the equivalent elements working analogously and used to solve similar problems.

Although the present invention has been described with reference to an exemplary embodiment thereof, various alterations and modifications can be made without departing from the spirit and scope of the invention, as those skilled in the art may easily understand.

These alterations and modifications are to be considered as falling within the essence and scope of the invention, as specified in the appended claims.

What is claimed is:

1. A fuel-feed system for an aircraft engine, said system comprising a fuel cleaning filter including a filtering element and housing means for housing said filtering element, inlet and outlet piping hydraulically communicating with said filter, a differential pressure transmitter hydraulically communicating with both said inlet and outlet piping, upstream and downstream of said filter and connected in parallel with said filter, a nozzle including a discharge portion in said housing means, return piping hydraulically communicating said outlet piping directly with said nozzle in said housing means, a single high-pressure pump connected in said outlet piping and communicating with said return piping, a shut-off valve connected in said return piping, means connecting said shut-off valve and said differential pressure transmitter to open said shut-off valve upon an increase of differential pressure in said filter and allow said return piping to pass fuel having traveled through the high-pressure pump back to said nozzle under high pressure to wash said filtering element, a by-pass circuit connected to said outlet piping in parallel with said high pressure pump, a by-pass valve in said by-pass circuit, a second by-pass circuit connected between said inlet and outlet piping in parallel with said transmitter and filter, and a by-pass valve in said second by-pass circuit.

2. A fuel-feed system as claimed in claim 1 wherein said discharge portion of said nozzle embraces a portion of said filtering element, said discharge portion including a plurality of discharge openings through which fluid is to pass to wash said filtering element.

3. A fuel-feed system as claimed in claim 2 wherein said filtering element is cylindrical and said discharge portion of said nozzle is concentrically spaced uniformly therefrom, said discharge openings being directed at said filter element.

4. A fuel-feed system as claimed in claim 1 wherein said means connecting the shut-off volve and differential pressure transmitter includes a signalling means.

* * * * *